United States Patent
Ouderkirk et al.

(10) Patent No.: US 11,675,191 B2
(45) Date of Patent: Jun. 13, 2023

(54) HEAD MOUNTED DISPLAY AND LOW CONSPICUITY PUPIL ILLUMINATOR

(71) Applicant: 3M INNOVATIVE PROPERTIES COMPANY, St. Paul, MN (US)

(72) Inventors: Andrew J. Ouderkirk, St. Paul, MN (US); Timothy L. Wong, St. Paul, MN (US); Kandyce M. Bohannon, White Bear Lake, MN (US); Gilles J. Benoit, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 153 days.

(21) Appl. No.: 16/745,415

(22) Filed: Jan. 17, 2020

(65) Prior Publication Data
US 2020/0150439 A1    May 14, 2020

Related U.S. Application Data

(63) Continuation of application No. 15/127,040, filed as application No. PCT/US2015/023000 on Mar. 27, 2015, now Pat. No. 10,545,340.
(Continued)

(51) Int. Cl.
*G02B 27/01* (2006.01)
*G02B 27/14* (2006.01)
(Continued)

(52) U.S. Cl.
CPC ....... *G02B 27/0172* (2013.01); *G02B 5/3083* (2013.01); *G02B 27/0093* (2013.01);
(Continued)

(58) Field of Classification Search
CPC ............ G02B 27/0172; G02B 27/0176; G02B 27/141; G02B 2027/0174;
(Continued)

(56) References Cited

U.S. PATENT DOCUMENTS

| 5,654,827 A | 8/1997 | Reichert |
| 5,715,023 A | 2/1998 | Hoppe |

(Continued)

FOREIGN PATENT DOCUMENTS

| DE | 102005062847 | 7/2007 |
| JP | 2007286317 | 11/2007 |

(Continued)

OTHER PUBLICATIONS

International Search Report for PCT International Application No. PCT/US2015/023000, dated Jul. 8, 2015, 4 pages.

*Primary Examiner* — Marin Pichler
(74) *Attorney, Agent, or Firm* — Robert S. Moshrefzadeh

(57) ABSTRACT

The present disclosure provides for an optical element useful in an optical device for illuminating the pupil of an eye, particularly for use with a head mountable display that can include eye-tracking. The optical device includes a light source and an optical element that transmits light, where light emitted from the light source is directed by the optical element toward the pupil of the eye, and attributes of the eye can then be detected by an optical sensor such as a camera. The light source can emit infrared light that is not visible to the human eye, so that world view images and/or combined digital images of the head-mountable display are not compromised.

2 Claims, 5 Drawing Sheets

Related U.S. Application Data

(60) Provisional application No. 61/977,171, filed on Apr. 9, 2014.

(51) Int. Cl.
    *G02B 27/00*     (2006.01)
    *G02B 5/30*     (2006.01)

(52) U.S. Cl.
    CPC .... *G02B 27/141* (2013.01); *G02B 2027/0138* (2013.01); *G02B 2027/0178* (2013.01)

(58) Field of Classification Search
    CPC .... G02B 2027/0178; G02B 2027/0192; G02B 2027/0194; G02B 2027/0196; G02B 2027/0112; G02B 2027/0114; G02B 2027/0118; G02B 2027/0138; G02B 2027/013; G02B 2027/141; G02B 27/0101; G02B 27/0093; G02B 5/3083; G02B 27/283; G02B 27/286
    USPC ........ 359/359, 633, 629, 630, 631, 638, 639
    See application file for complete search history.

(56) References Cited

U.S. PATENT DOCUMENTS

| | | | |
|---|---|---|---|
| 5,801,885 | A | 9/1998 | Togino |
| 6,075,651 | A | 6/2000 | Hoppe |
| 6,384,982 | B1 | 5/2002 | Spitzer |
| 6,421,183 | B1 | 7/2002 | Ophey |
| 8,576,484 | B2 | 11/2013 | Okamoto |
| 8,743,298 | B2 | 6/2014 | Inoue |
| 2007/0273970 | A1* | 11/2007 | Hoppe et al. |
| 2008/0051135 | A1 | 2/2008 | Destain et al. |
| 2008/0278812 | A1 | 11/2008 | Amitai |
| 2010/0202048 | A1 | 8/2010 | Amitai et al. |
| 2012/0019645 | A1 | 1/2012 | Maltz |
| 2012/0056897 | A1 | 3/2012 | Okamoto |
| 2012/0062990 | A1 | 3/2012 | Okamoto |
| 2012/0086907 | A1 | 4/2012 | Coleman et al. |
| 2012/0147465 | A1 | 6/2012 | Ruhle et al. |
| 2013/0222384 | A1 | 8/2013 | Futterer |
| 2013/0265227 | A1 | 10/2013 | Julian |
| 2013/0265231 | A1 | 10/2013 | Cleveland et al. |
| 2014/0240843 | A1* | 8/2014 | Kollin ................. G02B 27/017 359/633 |
| 2015/0287048 | A1* | 10/2015 | Nortrup ................. G06F 3/013 705/7.29 |
| 2016/0209656 | A1 | 7/2016 | Urey |

FOREIGN PATENT DOCUMENTS

| | | |
|---|---|---|
| JP | 2009-157634 | 7/2009 |
| KR | 10-2014-0017735 | 2/2014 |
| WO | WO 99/36826 | 7/1999 |
| WO | WO 2008/082703 | 7/2008 |
| WO | WO 2008/129539 | 10/2008 |
| WO | WO 2013/066634 | 5/2013 |
| WO | WO 2013/070788 | 5/2013 |
| WO | WO 2013/103443 | 7/2013 |
| WO | WO 2013/112705 | 8/2013 |
| WO | WO 2013/122711 | 8/2013 |
| WO | WO 2015/142654 | 9/2015 |
| WO | WO 2015/157482 | 10/2015 |

\* cited by examiner

HEAD MOUNTED DISPLAY AND LOW CONSPICUITY PUPIL ILLUMINATOR

CROSS REFERENCE TO RELATED APPLICATIONS

This application is a continuation of U.S. application Ser. No. 15/127,040, filed Sep. 19, 2016, now published, which is a National Stage entry of International Application No. PCT/US2015/023000, filed Mar. 27, 2015, which claims the benefit of U.S. Provisional Application No. 61/977,171, filed Apr. 9, 2014, the disclosure of which is incorporated by reference in their entirety herein.

BACKGROUND

A major trend in wearable devices is not only providing data to a user, but also sensing important information from a user. The user's eyes can provide critical information to help the user navigate through screens, monitor the health and alertness of the user, and provide feedback on reactions of the user to different sources of information. Eye monitoring commonly requires illumination sources, typically infrared lights, to be positioned in front of the eye. This front illumination adds devices and electrical connections to a highly visible part of eyewear, often limiting design aesthetics. Furthermore, the electrical connections can often pass through the hinge of the eyewear, and can result in the hinge becoming stiffer, reducing the reliability of the electrical connection, or both. There is a need for eye monitoring illumination systems to be positioned elsewhere on the eyewear.

SUMMARY

The present disclosure provides for an optical element useful in an optical device for illuminating the pupil of an eye, particularly for use with a head mountable display that can include eye-tracking. The optical device includes a light source and an optical element that transmits light, where light emitted from the light source is directed by the optical element toward the pupil of the eye, and attributes of the eye can then be detected by an optical sensor such as a camera. The light source can emit infrared light that is not visible to the human eye, so that world view images and/or combined digital images of the head-mountable display are not compromised.

In one aspect, the present disclosure provides an optical element that includes a lens having a concave first major surface, an opposing second major surface, and an embedded reflector disposed therebetween; a reflective polarizer aligned to a first polarization direction and disposed adjacent the concave first major surface; and a retarder between the reflective polarizer and the embedded reflector, the retarder having a fast axis aligned at a retarder angle to the first polarization direction.

In another aspect, the present disclosure provides a head-mountable display that includes a lens having a concave first major surface, an opposing second major surface, and an embedded reflector disposed therebetween; a reflective polarizer aligned to a first polarization direction and disposed adjacent the concave first major surface; and a retarder between the concave first major surface and the reflective polarizer, the retarder having a fast axis aligned at a retarder angle to the first polarization direction. The head-mountable display further includes an image forming device positioned to project an image light beam toward the concave first major surface, the image light beam comprising light polarized in the first polarization direction, wherein at least a portion of the image light beam is capable of being directed toward an eye disposed adjacent the image forming device.

In yet another aspect, the present disclosure provides a head-mountable tracking device that includes a lens having a concave first major surface and an opposing second major surface; a partial reflector disposed adjacent to the concave first major surface; an illuminator positioned to project a light beam toward the partial reflector, a portion of the light beam reflected by the partial reflector and capable of illuminating an eye positioned adjacent the illuminator; and an image receiving device positioned adjacent the illuminator and capable of receiving an image of the illuminated eye reflected from the partial reflector.

In yet another aspect, the present disclosure provides a tracking head-mountable display that includes a lens having a concave first major surface, an opposing second major surface, and an embedded reflector; a reflective polarizer aligned to a first polarization direction and disposed adjacent the concave first major surface; and a retarder between the concave first major surface and the reflective polarizer, the retarder having a fast axis aligned at a retarder angle to the first polarization direction. The tracking head-mountable display further includes an image forming device positioned to project an image light beam toward the concave first major surface, the image light beam comprising light polarized in the first polarization direction, wherein at least a portion of the image light beam is capable of being directed toward an eye disposed adjacent the image forming device; an illuminator positioned adjacent the image forming device, capable of projecting an illuminator light beam toward the reflective polarizer; and an image receiving device positioned adjacent the illuminator; wherein the reflective polarizer, the retarder, and the embedded reflector together are capable of illuminating the eye positioned adjacent the illuminator, the image receiving device being capable of receiving an image of the illuminated eye.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
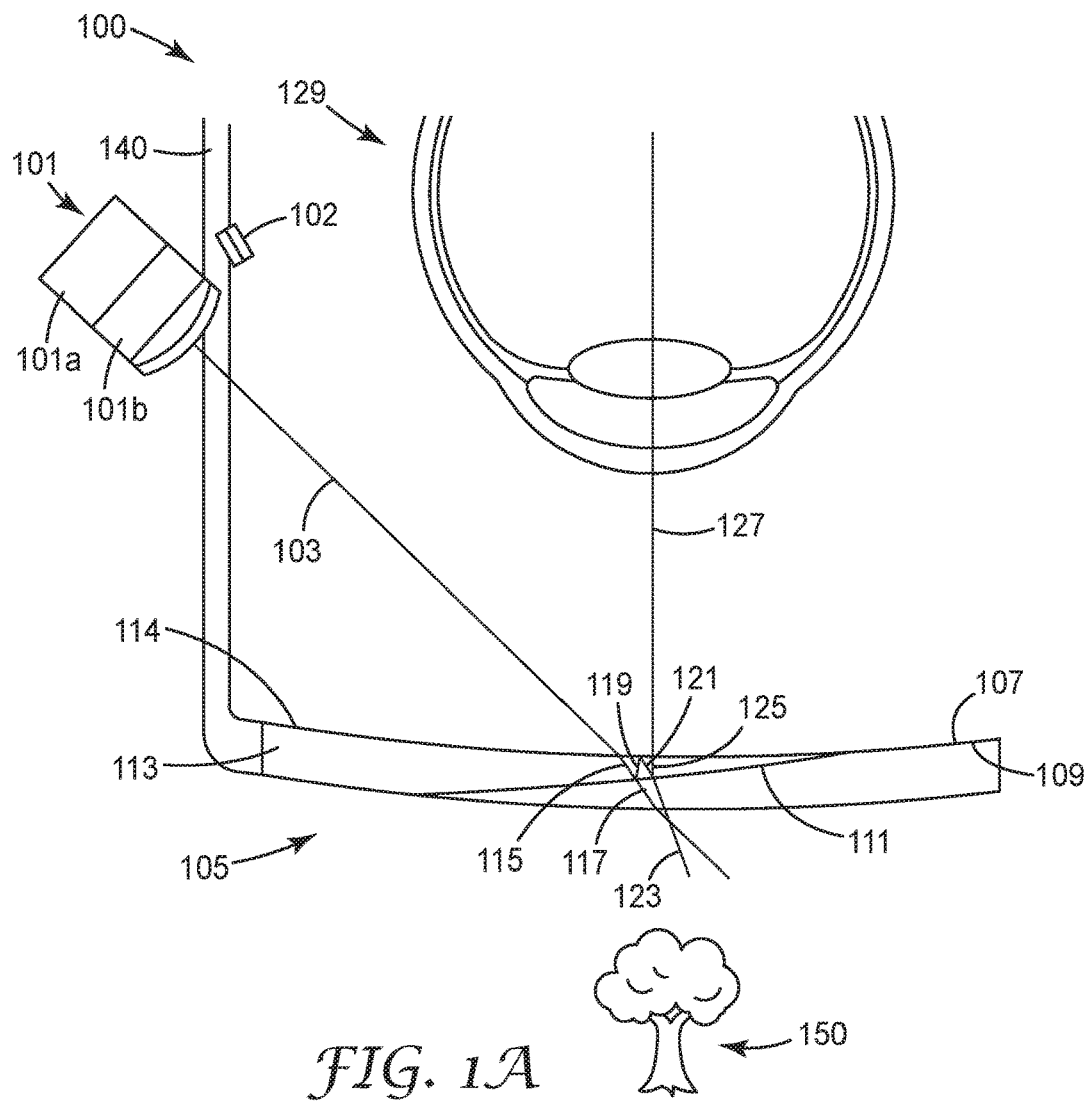
FIG. 1A shows a schematic cross-sectional view of a head mountable display system.

The present disclosure provides for an optical element useful in an optical device for illuminating the pupil of an eye, particularly for use with a head mountable display that can include eye-tracking. The optical device includes a light source and an optical element that transmits light, where light emitted from the light source is directed by the optical element toward the pupil of the eye, and attributes of the eye can then be detected by an optical sensor such as a camera. The light source can emit infrared light that is not visible to the human eye, so that world view images and/or combined digital images of the head-mountable display are not compromised.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Combining or "combiner" near-eye displays generally rely on the use of optics to both transmit the real world view to the user, and also project a secondary (e.g., digital) image to the eye. One type of combiner display may use a partial mirror, such as a 50% visible light transmission (VLT) mirror, which can transmit part of the world view and also reflect part of the secondary image. Another type of combiner display may use a reflective or weakly reflective polarizer which can nearly fully transmit one polarization state of the world view to the user and also nearly fully (or at least partially) reflect a polarized secondary image to the user. Another type of combiner display may use a dichroic, "notch", or "comb" type reflector which can reflect a band of wavelengths of light (e.g., a first wavelength range of light) to a certain extent but also transmit other bands of wavelengths (e.g., second or more wavelength range of light) or partially transmit the reflection band of wavelengths.

A head-mountable display as provided herein is capable of transmitting a view of the real world to the user's eye(s) while also reflecting or transmitting a secondary image, such as one produced via a digital display. In one particular embodiment, an optical element such as a lens includes a coating or film that has a dichroic, "notched", or "comb" type transmission and reflection profile. In one particular embodiment, the optical element includes a reflective polarizer that reflects one polarization state (e.g., a first polarization direction) and passes another polarization state (e.g., a second polarization direction orthogonal to the first polarization direction) to varying degrees. In some cases, the optical element may also include retarding layer such as a quarter-wave retarder. In some cases, the shape of the optical element can provide for a magnification of either of the secondary images, the real world view image, or both.

This transmission/reflection profile of the optical element (whether polarization dependent, wavelength dependent, or independent) enables the user to see, simultaneously, a view of the real world "combined" with the second image based on the wavelengths and/or polarization states of the real world and second image. The optical element itself or in combination with another refractive element and/or film and/or coating may provide image magnification based on refraction through and/or reflection from curved surfaces.

The optical device for illuminating the pupil of an eye, and the image sensor (e.g., camera) for gathering attributes of the eye, can be used as a stand-alone eye monitoring device, or it can be used in tandem with the head mounted display. Further descriptions of head mounted displays useful with the present invention include, for example, co-pending U.S. Provisional Patent Application Ser. No. 61/954,690, filed Mar. 18, 2014 entitled "Low Profile Image Combiner for Near-Eye Displays" and also U.S. Provisional Patent Application Ser. No. 61/977,166, filed Apr. 9, 2014, entitled "Near Eye Display System." In one particular embodiment, the optical device for illuminating the pupil can be positioned adjacent the digital display for producing the secondary image in the head-mountable display that combines the real-world and secondary image. In some cases, the digital display and the image sensor can be positioned in the same imaging device, further reducing the electronics for use with a head mountable display that can include eye-tracking. It is to be understood that any of the eye illumination and sensing devices described herein can be used with a head-mounted display capable of providing a combined world-view and digital image.

Figure 1B:
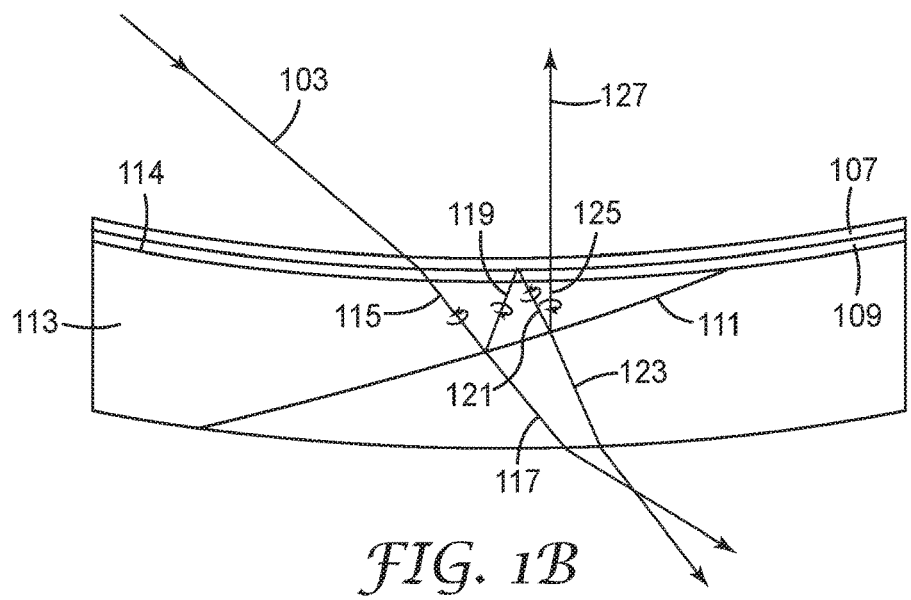
FIG. 1B shows a schematic cross-sectional view of an optical element of FIG. 1A.

FIG. 1A shows a schematic cross-sectional view of a head mountable display system 100, and FIG. 1B shows schematic cross-sectional view of an optical element of FIG. 1A, according to one aspect of the disclosure. Head mounted display 100 includes a frame 140 that can be used to position the head mountable display system on a users head (not shown). Frame 140 supports an image source 101, which generates an image with a chief ray 103. The image source 101 may include both an image generator 101a and an image sensor 101b such as a camera. The image generator 101a can be used to create a secondary image that can be combined with a real world view 150, as described elsewhere. The head-mounted display may also include a light source 102 affixed to the frame 140, as described elsewhere. The chief ray 103 is directed to an optical element 105 which includes a base lens 113 that has a first surface 114 bonded to a quarter-wave retarder 109, which is in turn bonded to a linear reflective polarizer 107. Optical element 105 is also affixed to the frame 140.

A first polarization direction of the chief ray is transmitted by the linear reflective polarizer 107, and the linearly polarized light is converted to circularly polarized light ray 115 which is reflected by an embedded reflector 111 disposed within the base lens 113, between the first surface 114 and an opposing second surface. The reflected light ray 119 has the opposite circular polarization of circularly polarized light ray 115. Reflected light ray 119 is transmitted through the quarter-wave retarder 109, becomes linearly polarized in the second polarization direction orthogonal to the first polarization direction, is reflected by the linear reflective polarizer 107, and is transmitted again through quarter-wave retarder 109, becoming circularly polarized in the opposite direction than reflected light ray 119. The resulting ray 121 is reflected by reflector 111 becoming ray 125, again switching direction of circular polarization. Ray 125 is transmitted through the quarter-wave retarder 109 and passes through reflective polarizer 107 becoming digital image ray 127 having the first polarization direction. Digital image ray 127 is then visible to an eye 129. The reflector 111 may be a partial reflector, and form partially transmitted rays 117 and 123. A partial reflector allows the user to see a world-view in combination with the display image, as described elsewhere.

Quarter-wave retarder 109 is a well known optical device that converts linearly polarized light to circularly polarized light, and circularly polarized light to linearly polarized light. Examples of suitable material include ZeonorFilm® ZM16-138, available from Zeon Corp, Japan. The film is preferably oriented such that the stretch axis of the film is at a 45 degree angle from the block polarization axis of the linear reflective polarizer. In some cases, the retarder can be disposed immediately adjacent the reflective polarizer 107; however, in some cases, the retarder can instead be disposed immediately adjacent the reflector 111.

The partial reflector can be a dichroic reflector capable of reflecting at least a first wavelength range of light and transmitting other wavelength ranges of light, or the partial reflector can be a broadband partial mirror. In some cases, the embedded reflector 111 can be a curved reflector or a planar reflector.

Figure 2:
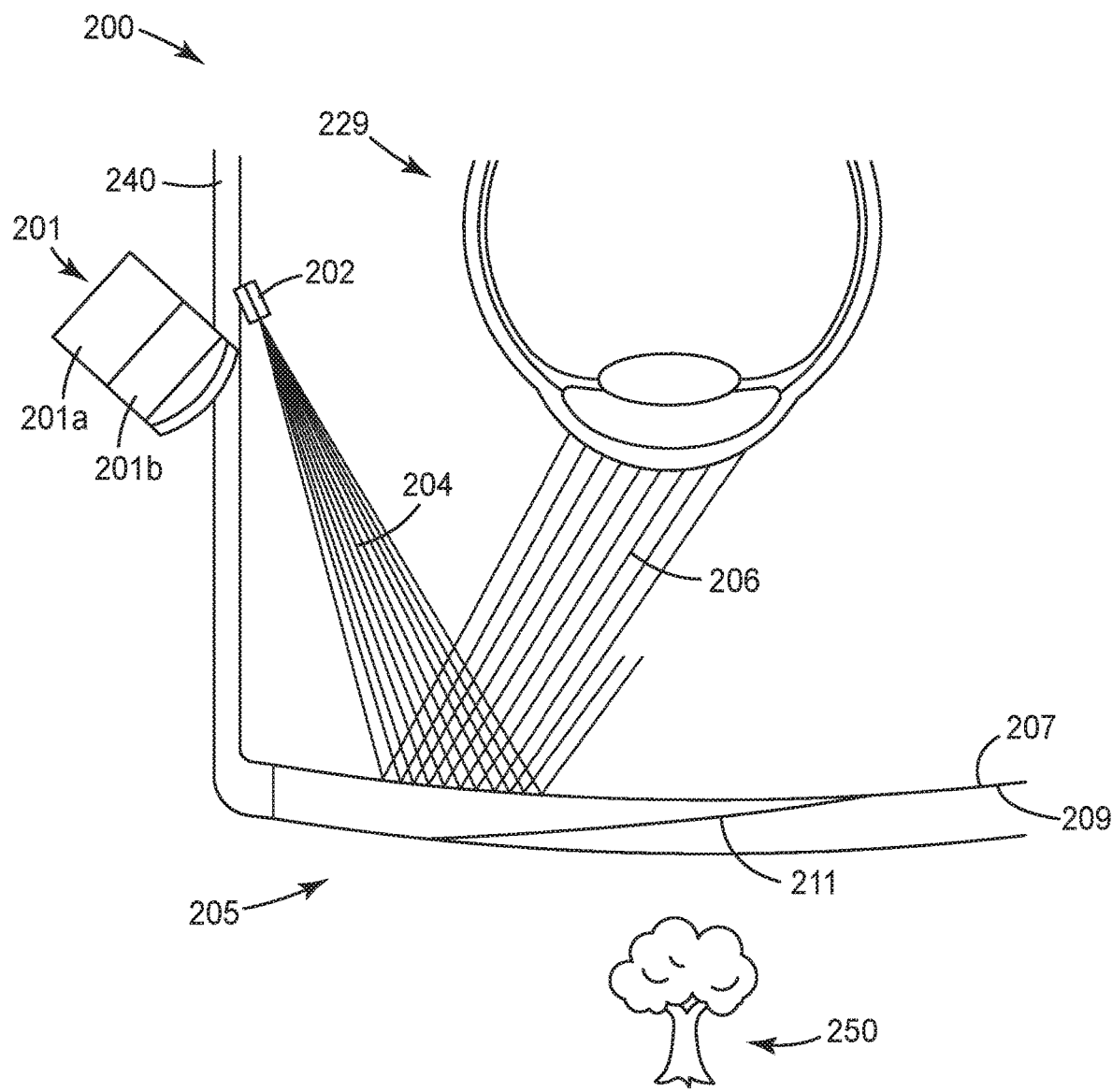
FIG. 2 shows a schematic cross-sectional view of a head-mountable tracking device.

FIG. 2 shows a schematic cross-sectional view of a head-mountable tracking device 200, according to one aspect of the disclosure. Each of the elements 201-250 shown in FIG. 2 correspond to like-numbered elements 101-150 shown in FIG. 1, which have been described previously. For example, frame 240 shown in FIG. 2 corresponds to frame 140 shown in FIG. 1, and so on. In FIG. 2, the head-mountable tracking device 200 shows illumination of the iris of the eye 229 with light, where a light source 202 (also referred to as an illuminator 202) emits light forming ray bundle 204, which then illuminates optical element 205 having a surface with a partial reflector 207. At least a portion of ray bundle 203 is reflected by partial reflector 207 forming ray bundle 206, which illuminates the iris of the eye 229. A camera 201b forms an image of the iris, and the image can be processed to determine one or more attributes of the eye 229.

These attributes of the eye 229 that can be detected may include one or more of the following: the viewing direction of the eye, diameter and changes in the diameter of the pupil, blinking of the eyelids, the eye tracking objects, and saccade movement. Eye tracking parameters may include velocity of the eye rotation and lag or phase between movement of an object and movement of the eye. Saccade movement may include duration, velocity, and pattern of the movement.

The partial reflector 207 may be made from a dichroic coating composed of one or more layers of an optically transparent material, using refractive index differences between the layers and adjacent layers to create reflection. The partial reflector may also be made of a thin metallic coating such as aluminum or silver. In some cases, the partial reflector may be made from a reflective polarizer. The partial reflector may be curved in one or more directions, or may be flat. Suitable optically transparent materials include silicon monoxide, silicon dioxide, magnesium fluoride, aluminum oxide, hafnium oxide, zirconium oxide, silicon nitride, titanium dioxide, polymer layers, other organic or inorganic materials, and combinations thereof.

The light source 202 may emit unpolarized light, polarized light, visible light, ultraviolet light, infrared light, or a combination thereof. All or a portion of the light may be linearly or circularly polarized. Using polarized light can change the illumination pattern on the eye (for example allowing either the lighting path shown in FIG. 2, or the lighting path shown below in FIG. 3, or a combination of the two).

Figure 3:
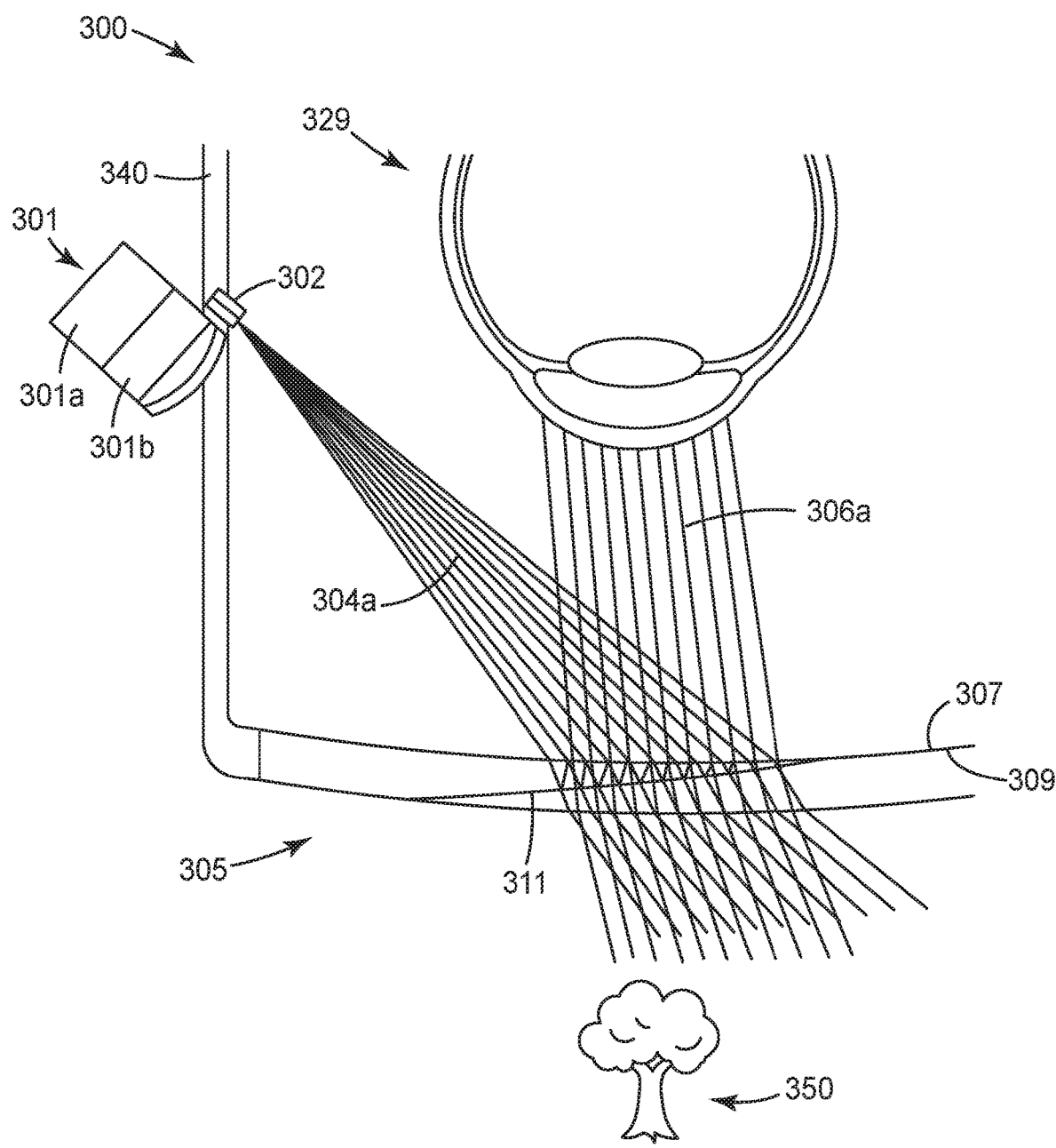
FIG. 3 shows a schematic cross-sectional view of a head-mountable tracking device.

FIG. 3 shows a schematic cross-sectional view of a head-mountable tracking device 300, according to one aspect of the disclosure. Each of the elements 301-350 shown in FIG. 3 correspond to like-numbered elements 101-150 shown in FIG. 1, which have been described previously. For example, frame 340 shown in FIG. 3 corresponds to frame 140 shown in FIG. 1, and so on. In FIG. 3, a different light path results, in a manner similar to the path of light shown in FIG. 1, and includes reflections of circularly polarized light from a partial reflector 311. A light source 302 emits light forming a ray bundle 304a, and at least a portion of the ray bundle 304a is transmitted by a reflective polarizer 307. The transmitted rays pass through a quarter-wave retarder 309 to a partial reflector 311. Rays reflected by the partial reflector 311 again pass through quarter-wave retarder 309, reflect off the reflective polarizer 307, again pass through the quarter-wave retarder 309, reflect off the partial reflector 311, pass a final time through quarter-wave retarder 309, and pass through the reflective polarizer 307, forming ray bundle 306a, which illuminates the iris of the eye 329.

Figure 4:
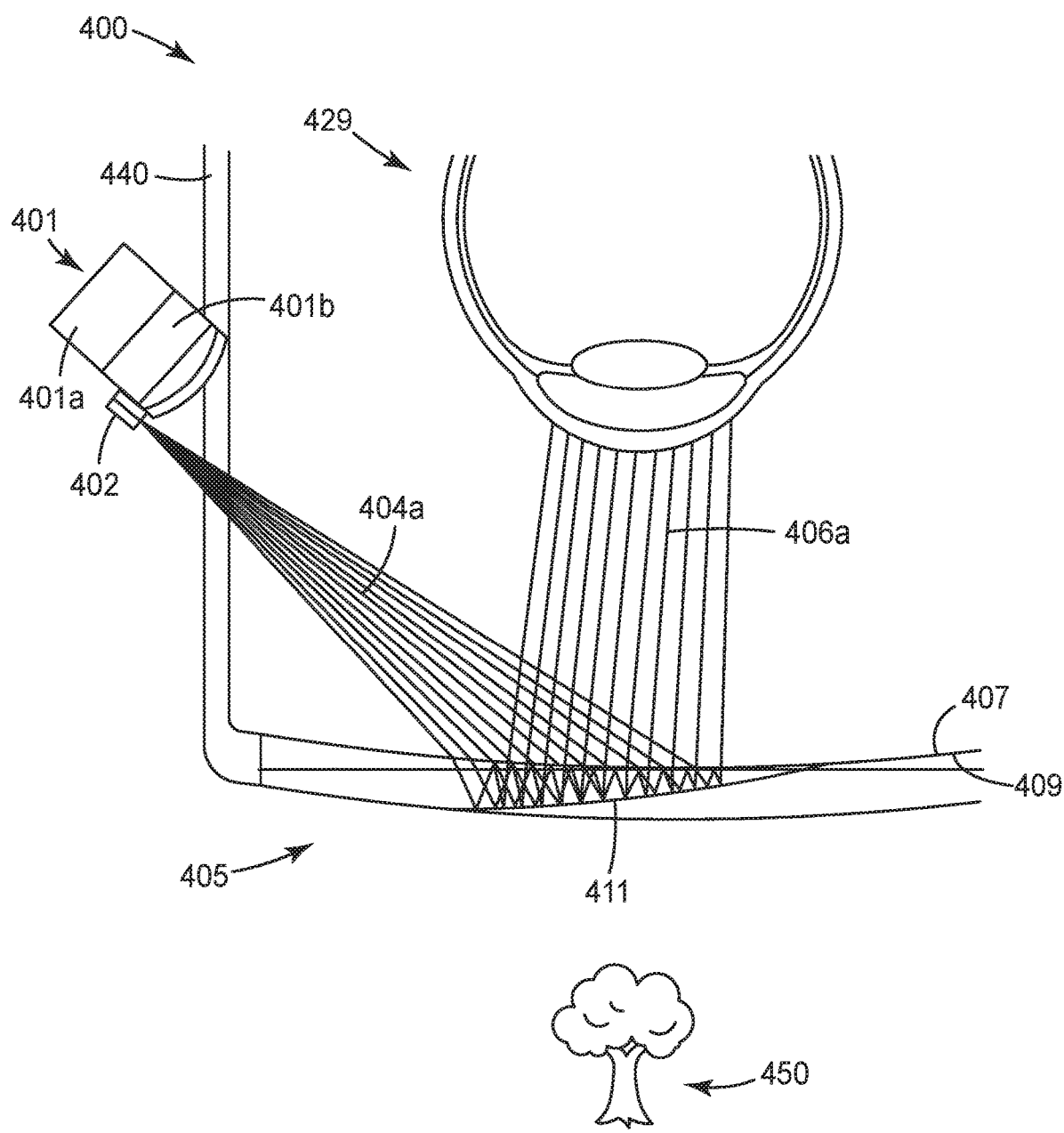
FIG. 4 shows a schematic cross-sectional view of a head-mountable tracking device.

FIG. 4 shows a schematic cross-sectional view of a head-mountable tracking device 400, according to one aspect of the disclosure. Each of the elements 401-450 shown in FIG. 4 correspond to like-numbered elements 101-150 shown in FIG. 1, which have been described previously. For example, frame 440 shown in FIG. 4 corresponds to frame 140 shown in FIG. 1, and so on. FIG. 4 shows a variation of the placement of the light source 402. The light source 402 may be placed adjacent to the camera 401b, and may be collinear with the center axis of the camera view through the use of a beam splitter (not shown), as known to one of skill in the art. Light source 402 emits light forming a ray bundle 404a, and at least a portion of the ray bundle 404a is transmitted by a reflective polarizer 407. The transmitted rays pass through a quarter-wave retarder 409 to a partial reflector 411. Rays reflected by the partial reflector 411 again pass through quarter-wave retarder 409, reflect off the reflective polarizer 407, again pass through the quarter-wave retarder 409, reflect off the partial reflector 411, pass a final time through quarter-wave retarder 409, and pass through the reflective polarizer 407, forming ray bundle 406a, which illuminates the iris of the eye 429. Multiple light sources 402 may be used, as well as unpolarized light, allowing for example, illumination combining one or more of the ray bundles 206, 306a, or 406a.

Figure 5:
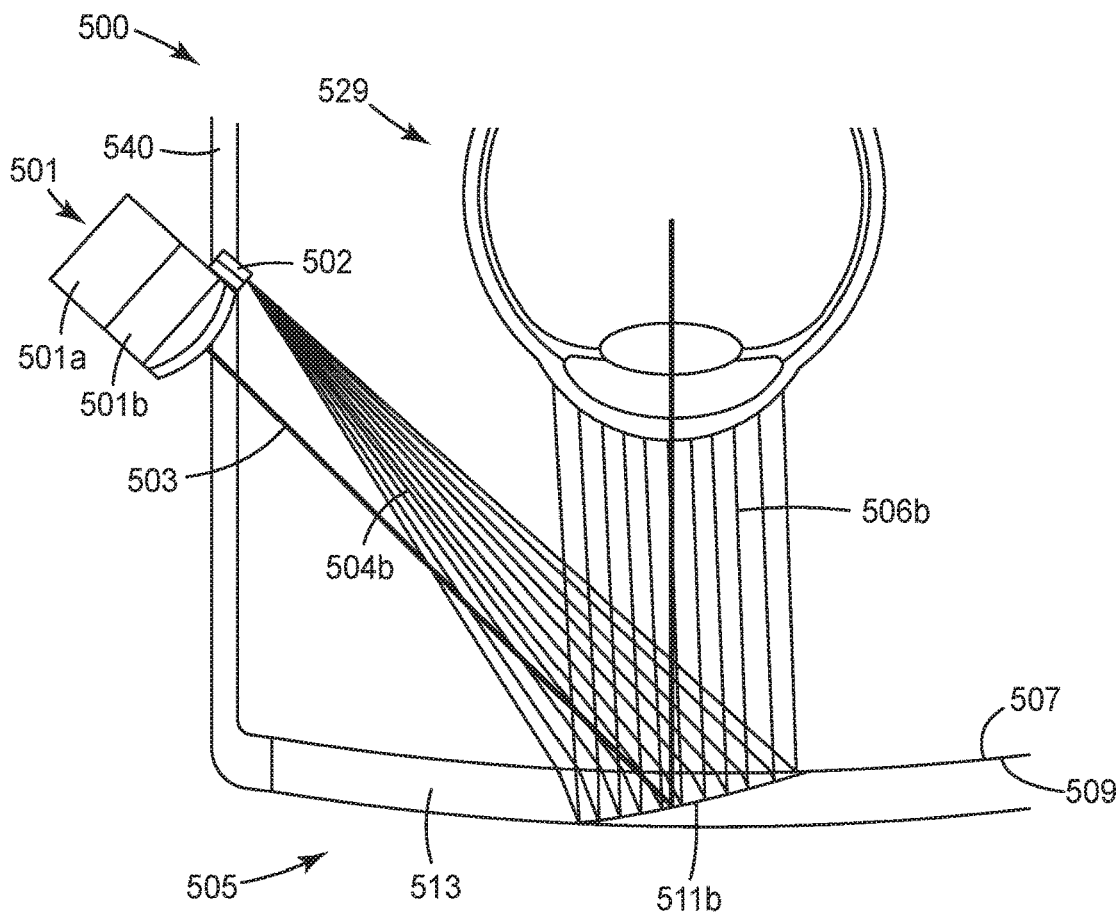
FIG. 5 shows a schematic cross-sectional view of a head-mountable tracking device.

FIG. 5 shows a schematic cross-sectional view of a head-mountable tracking device 500, according to one aspect of the disclosure. Each of the elements 501-550 shown in FIG. 5 correspond to like-numbered elements 101-150 shown in FIG. 1, which have been described previously. For example, frame 540 shown in FIG. 5 corresponds to frame 140 shown in FIG. 1, and so on. FIG. 5 shows another variation, where a light source 502 emits light forming ray bundle 504b, which is reflected by optical element 505 made from a reflective surface 511b immersed in lens 513. The reflected light forms ray bundle 506b which illuminates the iris of eye 529. Light reflected by the eye forms rays of light that approximately follow chief ray 503 to camera 501b. Reflective surface 511b may be a reflective polarizer. The reflective polarizer may be made from birefringent polymer optical stacks, such as Advanced Polarizing Film, available from 3M Company, a wire grid polarizer, a cholesteric reflective polarizer, or any other suitable reflective polarizer.

Figure 6:
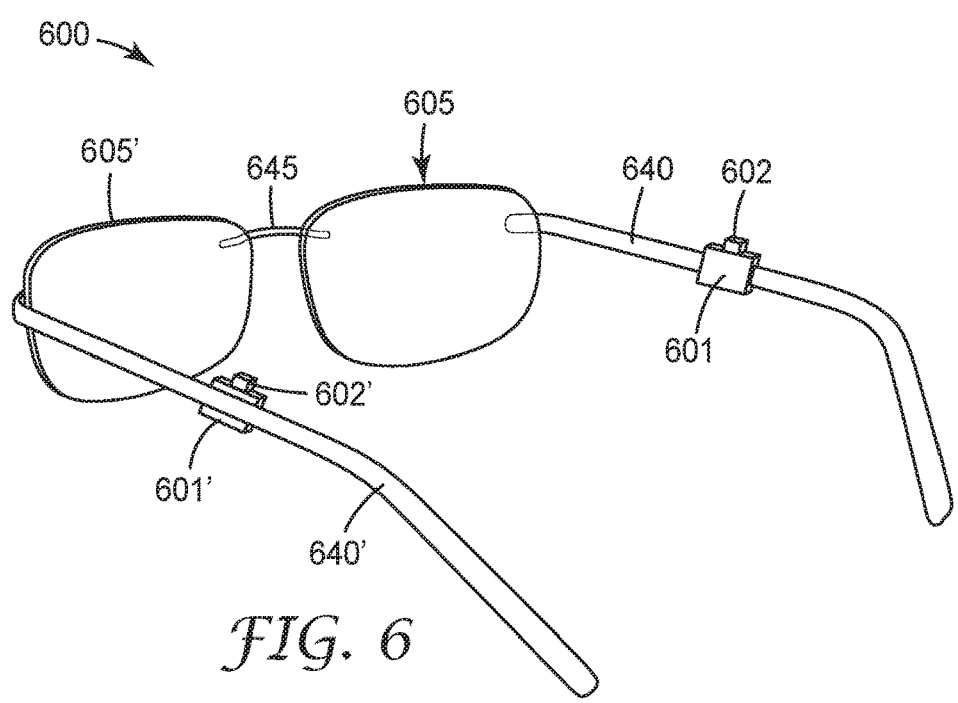
FIG. 6 shows a perspective view of a head-mounted tracking display system.

FIG. 6 shows a perspective view of a head-mounted tracking display system 600, according to one aspect of the disclosure. Each of the elements 601-640 and 601'-640' shown in FIG. 6 correspond to like-numbered elements 101-140 shown in FIG. 1, which have been described previously. For example, frame 640 shown in FIG. 6 corresponds to frame 640 shown in FIG. 1, and so on. Head-mounted tracking display system 600 includes a first image source 601 that is positioned to project an image light toward a first optical element 605, and an optional second image source 601' that is positioned to project a second image light toward an optional second optical element 605', as described elsewhere. Head-mounted tracking display system 600 further includes a first light source 602 and an optional second light source 602' disposed to project light toward first and second optical elements 605, 605', respectively, as described elsewhere. Each of the first and optional optical elements 605, 605'; first and optional second image sources 601, 601'; and first and optional second light sources 602, 602', can be attached to a first and a second frame 640, 640', which may be positioned on the user's head (not shown) similar to a pair of eyeglasses. The head-mounted tracking display system 600 further includes a bridge 645 connecting the first and second optical elements 605, 605' together.

It is to be understood that any of the eye-monitoring systems described herein can be combined with near-eye display systems having pellicle reflective elements, such as those described in co-pending U.S. Patent Application entitled "Near-Eye Display", filed on an even date herewith. The eye monitoring attributes that can be detected may include one or more of the following: the viewing direction of the eye, diameter and changes in the diameter of the pupil, blinking of the eyelids, the eye tracking objects, and saccade movement. Eye tracking parameters may include velocity of the eye rotation and lag or phase between movement of an object and movement of the eye. Saccade movement may include duration, velocity, and pattern of the movement. The described pellicles may be useful for providing the reflective surface for the pupil illuminator and image receiving optics, as well as for providing a reflective surface for the near-eye display, as can be readily understood to those having ordinary skill in the art.

Following are a list of embodiments of the present disclosure.

Item 1 is an optical element, comprising: a lens having a concave first major surface, an opposing second major surface, and an embedded reflector disposed therebetween; a reflective polarizer aligned to a first polarization direction and disposed adjacent the concave first major surface; and a retarder between the reflective polarizer and the embedded reflector, the retarder having a fast axis aligned at a retarder angle to the first polarization direction.

Item 2 is the optical element of item 1, wherein the retarder is disposed immediately adjacent the reflective polarizer.

Item 3 is the optical element of item 1 or item 2, wherein the retarder is disposed immediately adjacent the embedded reflector.

Item 4 is the optical element of item 1 to item 3, wherein the retarder is a quarter-wave retarder, and the retarder angle is about 45 degrees.

Item 5 is the optical element of item 1 to item 4, wherein the embedded reflector comprises a partial reflector.

Item 6 is the optical element of item 5, wherein the partial reflector comprises a dichroic reflector capable of reflecting at least a first wavelength range of light and transmitting other wavelength ranges of light.

Item 7 is the optical element of item 5, wherein the partial reflector comprises a broadband partial mirror.

Item 8 is the optical element of item 1 to item 7, wherein the embedded reflector is a planar reflector.

Item 9 is the optical element of item 1 to item 8, wherein the embedded reflector is a curved reflector capable of collimating an incident light beam.

Item 10 is a head-mountable display, comprising: a lens having a concave first major surface, an opposing second major surface, and an embedded reflector disposed therebetween; a reflective polarizer aligned to a first polarization direction and disposed adjacent the concave first major surface; a retarder between the concave first major surface and the reflective polarizer, the retarder having a fast axis aligned at a retarder angle to the first polarization direction; and an image forming device positioned to project an image light beam toward the concave first major surface, the image light beam comprising light polarized in the first polarization direction, wherein at least a portion of the image light beam is capable of being directed toward an eye disposed adjacent the image forming device.

Item 11 is the head-mountable display of item 10, wherein the retarder is disposed immediately adjacent the reflective polarizer.

Item 12 is the head-mountable display of item 10 or item 11, wherein the retarder is disposed immediately adjacent the embedded reflector.

Item 13 is the head-mountable display of item 10 to item 12, wherein the retarder is a quarter-wave retarder and the retarder angle is about 45 degrees.

Item 14 is the head-mountable display of item 10 to item 13, wherein the embedded reflector comprises a partial reflector.

Item 15 is the head-mountable display of item 14, wherein the partial reflector comprises a dichroic reflector capable of reflecting at least a first wavelength range of light and transmitting other wavelength ranges of light.

Item 16 is the head-mountable display of item 14, wherein the partial reflector comprises a broadband partial mirror.

Item 17 is the head-mountable display of item 10 to item 16, wherein the embedded reflector is a planar reflector.

Item 18 is the head-mountable display of item 10 to item 17, wherein the embedded reflector is a curved reflector capable of collimating an incident light beam.

Item 19 is the head-mountable display of item 10 to item 18, further comprising a tracking device disposed to detect a viewing direction of the eye, a diameter of the eye pupil, changes in a diameter of the eye pupil, a blinking of an eyelid, a tracking object of the eye, a saccade eye movement, or combination thereof.

Item 20 is the head-mountable display of item 19, wherein the tracking device comprises: an illuminator positioned to project a light beam toward the embedded reflector, a portion of the light beam reflected to illuminate the eye positioned adjacent the illuminator; an image receiving device positioned adjacent the illuminator and capable of receiving an image of the illuminated eye.

Item 21 is a head-mountable tracking device, comprising: a lens having a concave first major surface and an opposing second major surface; a partial reflector disposed adjacent to the concave first major surface; an illuminator positioned to project a light beam toward the partial reflector, a portion of the light beam reflected by the partial reflector and capable of illuminating an eye positioned adjacent the illuminator; and an image receiving device positioned adjacent the illuminator and capable of receiving an image of the illuminated eye reflected from the partial reflector.

Item 22 is the head-mountable tracking device of item 21, wherein the partial reflector comprises a dichroic reflector capable of reflecting at least a first wavelength range of light and transmitting other wavelength ranges of light.

Item 23 is the head-mountable tracking device of item 21 or item 22, wherein the partial reflector comprises a broadband partial mirror.

Item 24 is the head-mountable tracking device of item 21 to item 23, wherein the partial reflector comprises a reflective polarizer aligned to a first polarization direction and disposed adjacent the concave first major surface.

Item 25 is the head-mountable tracking device of item 21 to item 24, wherein the image receiving device is capable of detecting a viewing direction of the eye, a diameter of the eye pupil, changes in a diameter of the eye pupil, a blinking of an eyelid, a tracking object of the eye, a saccade eye movement, or combination thereof.

Item 26 is a tracking head-mountable display, comprising: a lens having a concave first major surface, an opposing second major surface, and an embedded reflector; a reflective polarizer aligned to a first polarization direction and disposed adjacent the concave first major surface; a retarder between the concave first major surface and the reflective polarizer, the retarder having a fast axis aligned at a retarder angle to the first polarization direction; an image forming device positioned to project an image light beam toward the concave first major surface, the image light beam comprising light polarized in the first polarization direction, wherein at least a portion of the image light beam is capable of being directed toward an eye disposed adjacent the image forming device; an illuminator positioned adjacent the image forming device, capable of projecting an illuminator light beam toward the reflective polarizer; and an image receiving device positioned adjacent the illuminator; wherein the reflective polarizer, the retarder, and the embedded reflector together are capable of illuminating the eye positioned adjacent the illuminator, the image receiving device being capable of receiving an image of the illuminated eye.

Item 27 is the tracking head-mountable display of item 26, wherein the retarder is disposed immediately adjacent the reflective polarizer.

Item 28 is the tracking head-mountable display of item 26 or item 27, wherein the retarder is disposed immediately adjacent the embedded reflector.

Item 29 is the tracking head-mountable display of item 26 to item 28, wherein the retarder is a quarter-wave retarder and the retarder angle is about 45 degrees.

Item 30 is the tracking head-mountable display of item 26 to item 29, wherein the embedded reflector comprises a partial reflector.

Item 31 is the tracking head-mountable display of item 30, wherein the partial reflector comprises a dichroic reflector capable of reflecting at least a first wavelength range of light and transmitting other wavelength ranges of light.

Item 32 is the tracking head-mountable display of item 30, wherein the partial reflector comprises a broadband partial mirror.

Item 33 is the tracking head-mountable display of item 26 to item 32, wherein the embedded reflector is a planar reflector.

Item 34 is the tracking head-mountable display of item 26 to item 33, wherein the embedded reflector is a curved reflector capable of collimating an incident light beam.

Item 35 is the tracking head-mountable display of item 26 to item 34, wherein the illuminator light beam comprises a polarized light beam aligned to the first polarization direction.

Item 36 is the tracking head-mountable display of item 26 to item 35, wherein image of the illuminated eye comprises a viewing direction of the eye, a diameter of the eye pupil, changes in a diameter of the eye pupil, a blinking of an eyelid, a tracking object of the eye, a saccade eye movement, and combination thereof.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A head-mountable display comprising:
   a lens comprising opposing first and second major surfaces and a partial reflector embedded in the lens between, and making oblique angles with, the first and second major surfaces;
   a reflective polarizer disposed adjacent the lens; and
   a quarter-wave retarder disposed between the reflective polarizer and the partial reflector, such that a chief ray from an image generated by an image source is transmitted by the reflective polarizer as a digital image ray visible to an eye after the chief ray is sequentially obliquely incident on and transmitted by the reflective polarizer, obliquely incident on and reflected by the embedded reflector, obliquely incident on and reflected by the reflective polarizer, and obliquely incident on and reflected by the embedded reflector.

2. The head-mountable display of claim 1, wherein the partial reflector comprises a broadband partial mirror.

* * * * *

UNITED STATES PATENT AND TRADEMARK OFFICE
CERTIFICATE OF CORRECTION

PATENT NO. : 11,675,191 B2
APPLICATION NO. : 16/745415
DATED : June 13, 2023
INVENTOR(S) : Andrew John Ouderkirk It is certified that error appears in the above-identified patent and that said Letters Patent is hereby corrected as shown below:

In the Claims

<u>Column 11</u>
Line 12, In Claim 1, delete "between, and making oblique angles with, the first" and insert -- between the first --, therefor.

Signed and Sealed this
Fifth Day of December, 2023

*Katherine Kelly Vidal*
Katherine Kelly Vidal
*Director of the United States Patent and Trademark Office*